(12) United States Patent  (10) Patent No.: US 7,530,915 B2
Grimm  (45) Date of Patent: May 12, 2009

(54) PARALLEL PATH ACCESSORY DRIVE

(75) Inventor: Duane H. Grimm, Rockford, IL (US)

(73) Assignee: Ingenium Technologies, Rockford, IL (US)

( * ) Notice: Subject to any disclaimer, the term of this patent is extended or adjusted under 35 U.S.C. 154(b) by 529 days.

(21) Appl. No.: 11/388,703

(22) Filed: Mar. 24, 2006

(65) Prior Publication Data

US 2006/0240927 A1  Oct. 26, 2006

Related U.S. Application Data

(60) Provisional application No. 60/673,287, filed on Apr. 20, 2005.

(51) Int. Cl.
*F16H 47/04* (2006.01)
(52) U.S. Cl. ........................................ 475/83
(58) Field of Classification Search .................. 475/83, 475/72, 80, 81, 82
See application file for complete search history.

(56) References Cited

U.S. PATENT DOCUMENTS

| 3,695,147 | A |   | 10/1972 | Siesennop et al. |
| 4,019,404 | A | * | 4/1977 | Schauer ......................... 475/82 |
| 4,091,717 | A | * | 5/1978 | Bojas et al. .................... 91/498 |
| 4,704,923 | A | * | 11/1987 | Taylor .......................... 475/73 |
| 5,676,034 | A |   | 10/1997 | Krantz |
| 6,533,695 | B2 | * | 3/2003 | Pollman et al. ................ 475/72 |
| 6,569,049 | B1 | * | 5/2003 | Folsom et al. ................. 475/72 |
| 6,663,525 | B1 | * | 12/2003 | McKee et al. ................. 475/72 |

* cited by examiner

*Primary Examiner*—Roger Pang (57) ABSTRACT

The invention provides an accessory drive that is a combination of mechanical and hydraulic components that accepts variable speed input power from a prime mover or engine and transmits that power in a very efficient manner to the output of the device to drive ancillary engine accessories (e.g., cooling fans, generators, water and fuel pumps, etc.). The accessory drive system allows the output speed of the drive and the speed of the engine accessories to be controlled in a manner that minimizes power consumption of the accessories and drive system.

14 Claims, 7 Drawing Sheets

FIG. 5

PARALLEL PATH ACCESSORY DRIVE

CROSS-REFERENCE TO RELATED PATENT APPLICATIONS

This patent application which claims the benefit of U.S. Provisional Patent Application No. 60/673,287, filed Apr. 20, 2005, the entire disclosure of which is hereby incorporated by reference.

FIELD OF THE INVENTION

This invention pertains to accessory drives, and more particularly to engine accessory drives.

BACKGROUND OF THE INVENTION

Conventional commercial and vehicle engine accessory drive systems waste energy. As the cost of operation increases due to fuel costs, maintenance, and wages, the desire for more efficient operation also increases. Industry has looked to several options to increase the efficiency of accessory drive systems.

Industry has looked into direct drive systems, friction clutch systems, hydro viscous drive systems, and hydrostatic accessory drive systems. All of these types of systems have drawbacks. For example, direct drive systems over-speed accessories and draw excessive power at medium to high engine speeds. Conventional friction clutch or hydro viscous accessory drive systems are inefficient. Hydrostatic accessory drive systems provide only modest efficiency improvements.

What is missing is an accessory drive that increases efficiency and provides cost savings.

BRIEF SUMMARY OF THE INVENTION

The invention provides such an accessory drive. These and other advantages of the invention, as well as additional inventive features, will be apparent from the description of the invention provided herein The invention provides an accessory drive that is a combination of mechanical and hydraulic components that accepts variable speed input power from a prime mover or engine and transmits that power in a very efficient manner to the output of the device to drive ancillary engine accessories (e.g., cooling fans, generators, water and fuel pumps, etc.). The accessory drive system allows the output speed of the drive and the speed of the engine accessories to be controlled in a manner that minimizes power consumption of the accessories and drive system.

The major components of the drive are the input, a secondary hydraulic path comprising a variable displacement hydraulic unit (V-unit) and a fixed displacement hydraulic unit (F-unit), and an output differential. The input is the primary mechanical power path for the drive and serves to transmit mechanical power from the engine to the secondary hydraulic power path and the output differential. The secondary hydraulic power path transmits power to the output differential at a variable speed determined by the displacement ratios of the V-unit and F-unit. The displacement ratio is varied by the accessory drive system control system to maintain the desired accessory speed for any engine operating condition.

The power flow from the primary mechanical path and the secondary hydraulic path are combined by the output differential. The secondary hydraulic path power flow is only a fraction of the total power transmitted to the accessory and serves as a trim function to adjust the speed of the output of the accessory drive system. The fact that most of the power is transmitted through the highly efficient input power path provides a variable speed drive system with a very high overall efficiency.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides an accessory drive that is a combination of mechanical and hydraulic components that accepts variable speed input power from a prime mover or engine and transmits that power in a very efficient manner to the output of the device to drive ancillary engine accessories (e.g., cooling fans, generators, water and fuel pumps, etc.). The accessory drive system allows the output speed of the drive and the speed of the engine accessories to be controlled in a manner that minimizes power consumption of the accessories and drive system. The invention provides significant efficiency improvements and substantial fuel consumption and cost savings over the life of the engine.

Figure 1:
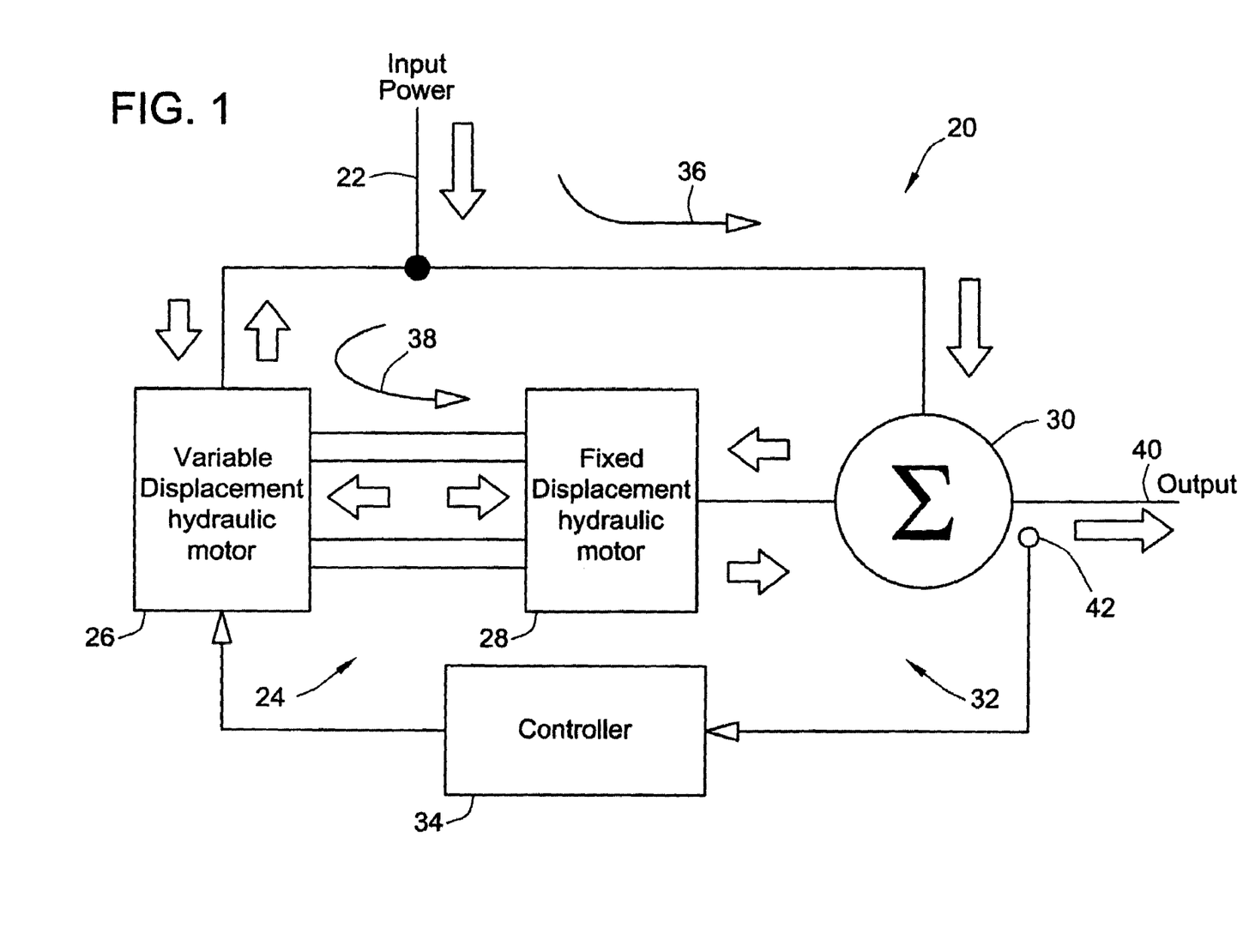
FIG. 1 is a block diagram of an exemplary operating system in which the invention operates.

Turning to the drawings, wherein like reference numerals refer to like elements, the invention is illustrated as being implemented in an engine environment 20 such as an off-road engine, an over-the-road engine, etc. The invention may be used in other environments such as a power generator (e.g., a turbine generator) and the like. The major components of the drive are the input power 22, a secondary hydraulic path 24 comprising a variable displacement hydraulic unit (V-unit) 26 and a fixed displacement hydraulic unit (F-unit) 28, and an output differential 30. The accessory drive 32 (comprising components 22-30) is controlled via controller 34. Controller 34 may be integral to the accessory drive, a separate unit, or part of an engine controller (not shown).

The input 22 is the primary mechanical power path for the drive 32 and serves to transmit mechanical power from the engine to the secondary hydraulic power path 24 and the output differential 30. The secondary hydraulic power path transmits power to the output differential 30 at a variable speed determined by the displacement ratios of the V-unit 26 and F-unit 28. The displacement ratio is varied by the accessory drive system control system 34 to maintain the desired accessory speed (i.e., the output speed of the output differential) for any engine operating condition.

The power flow from the primary mechanical path (represented by arrow 36) and the secondary hydraulic path (represented by arrow 38) are combined by the output differential 30. The secondary hydraulic path power flow is only a fraction of the total power transmitted to the accessory and serves as a trim function to adjust the speed of the output 40 of the accessory drive system. The fact that most of the power is transmitted through the highly efficient input power path provides a variable speed drive system with a very high overall efficiency. During operation, the controller 34 senses the accessory speed via a speed sensor 42 and adjusts the displacement ratio by changing the position of a control piston 78 that is used to vary the position of the V-unit 26, thereby changing the displacement of V-unit 26.

Figure 2:
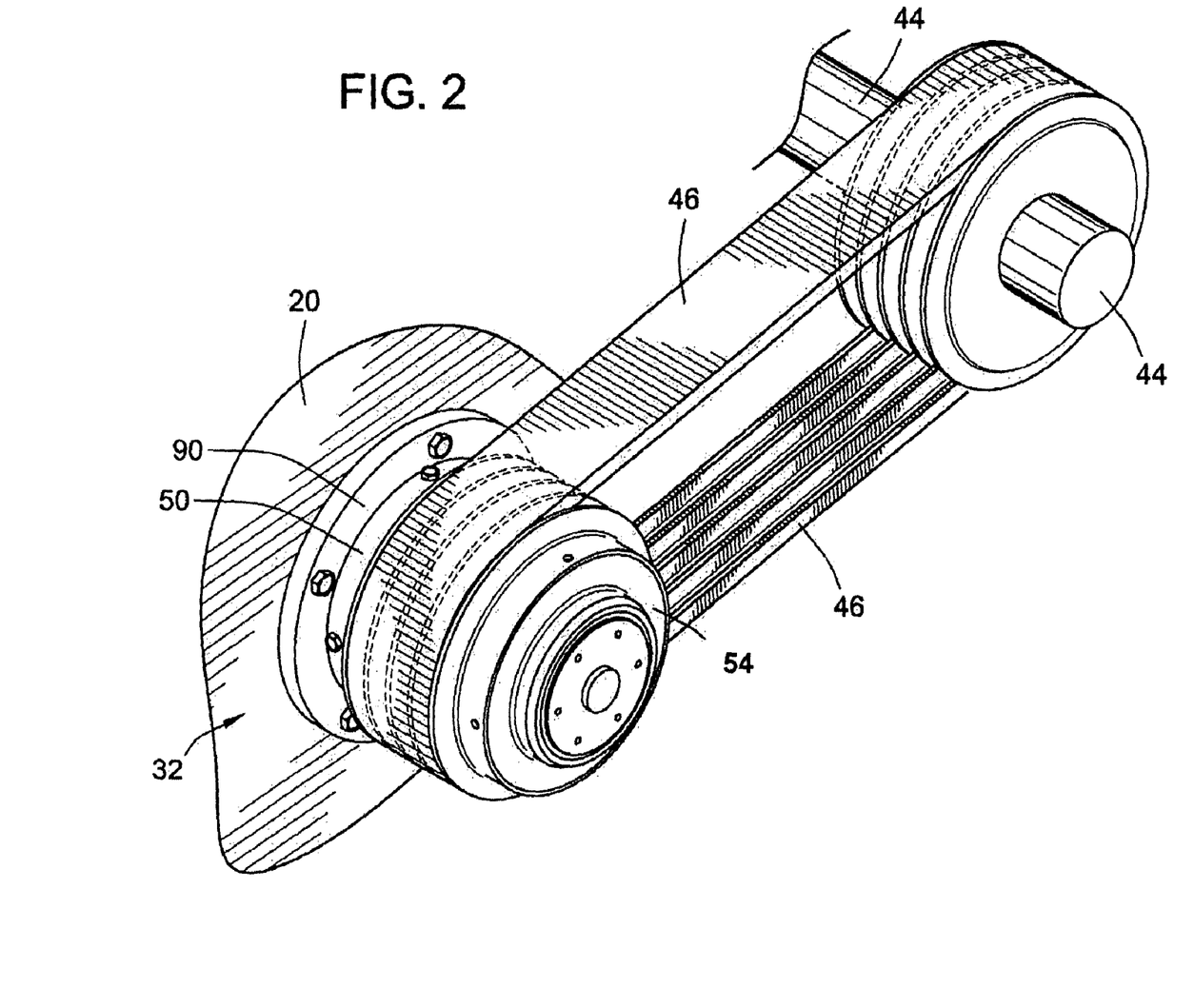
FIG. 2 is an isometric view of an embodiment of the invention being driven by an engine shaft.

Turning now to FIG. 2, an embodiment of the accessory drive 32 is shown affixed within the engine environment 20. Engine power is transmitted to the input 22 (See FIG. 1) of the drive system 32 through a multiple groove v-belt 46 driven by an engine shaft 44. With this approach, the pulley serves as the input element to the drive and transmits power to the V-unit 26 and the output differential 30 as will be described below. Note that any type of V and F hydraulic units can be used. In the description that follows, radial ball piston hydraulic units will be used to explain the operation of this embodiment of the invention. Any type of mechanical differential can be used, but a sun-ring-carrier arrangement shall be used to describe the invention.

Figure 3A:
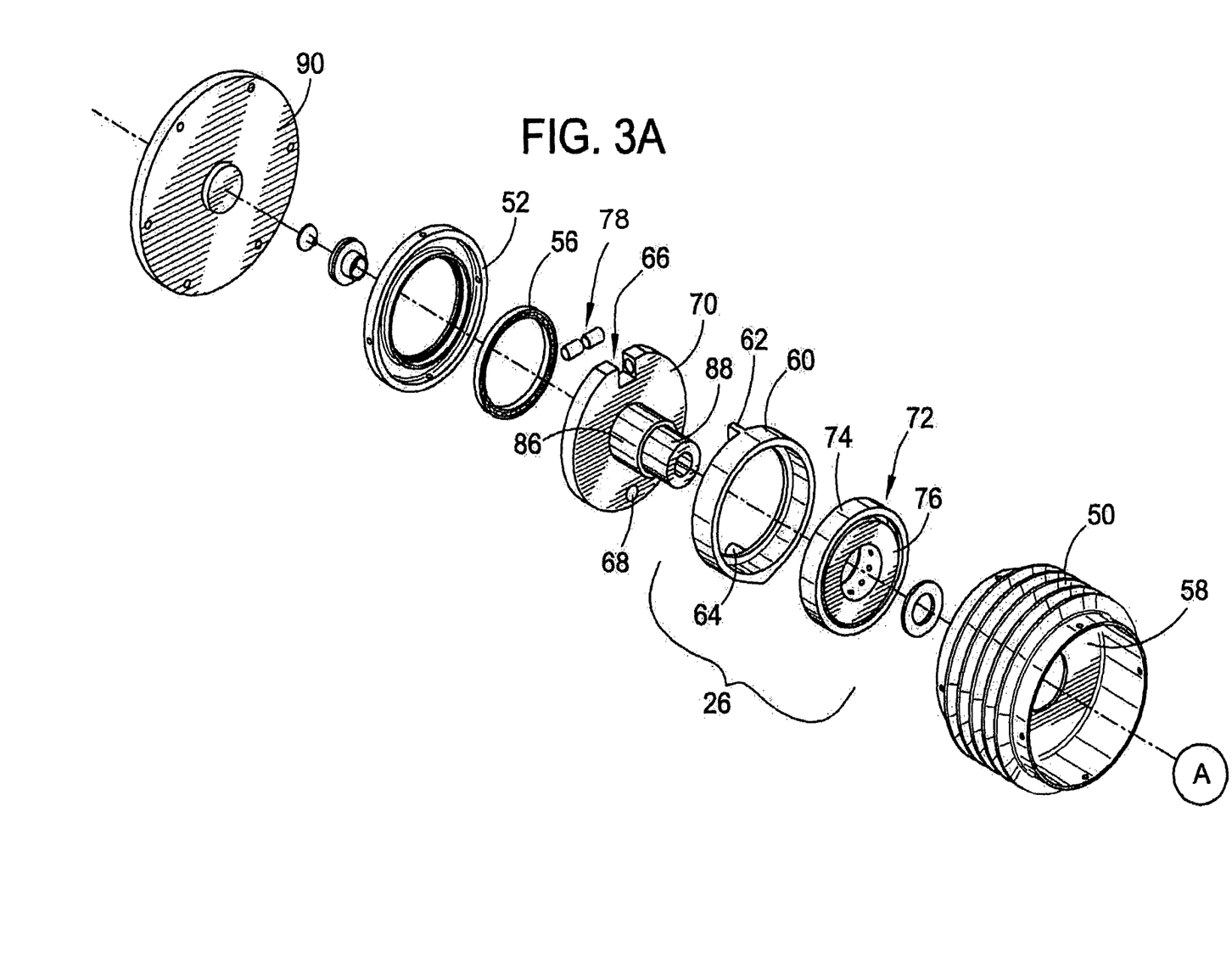
FIGS. 3A and 3B are an exploded isometric view of the embodiment of FIG. 2.
Figure 3B:
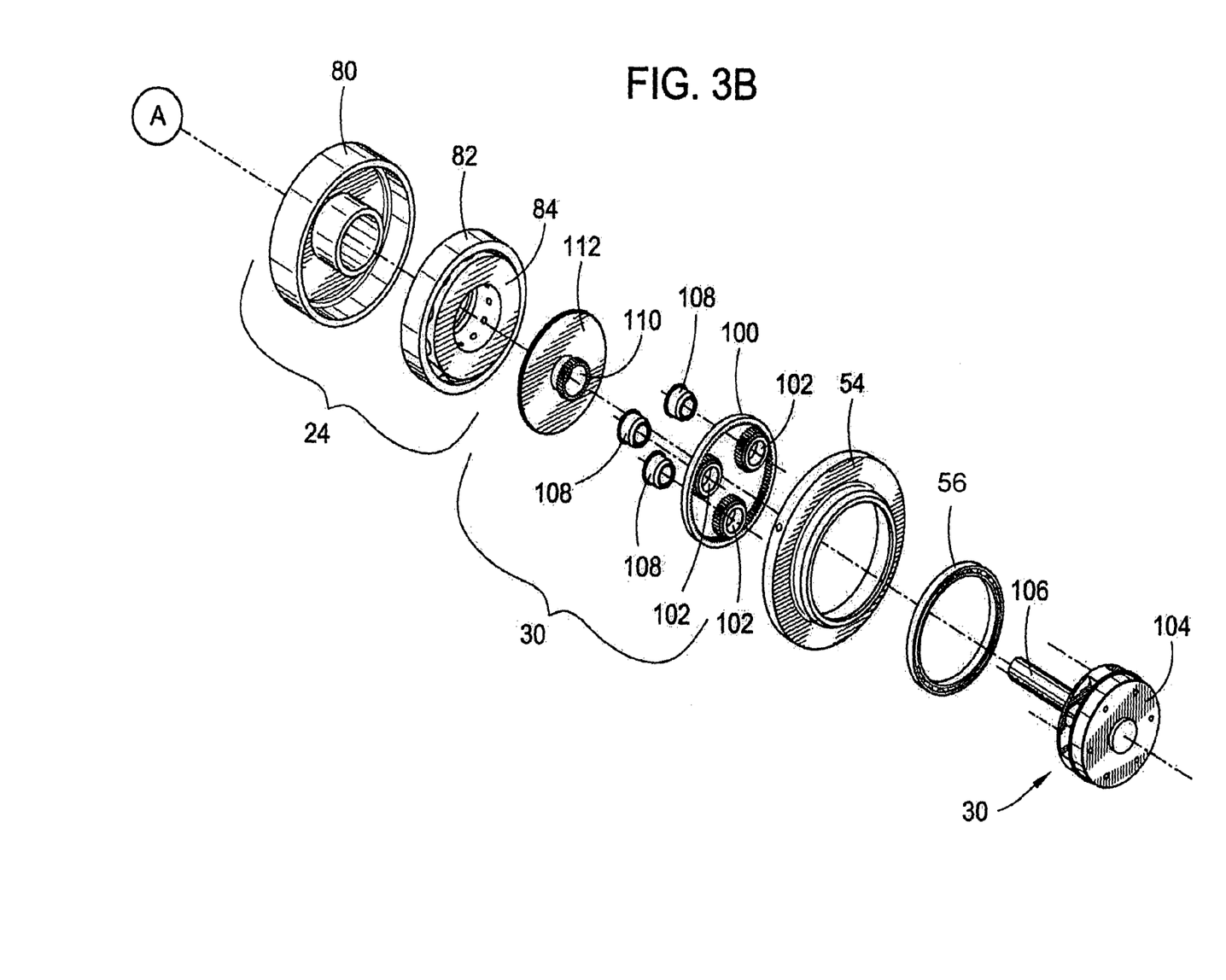
Figure 4:
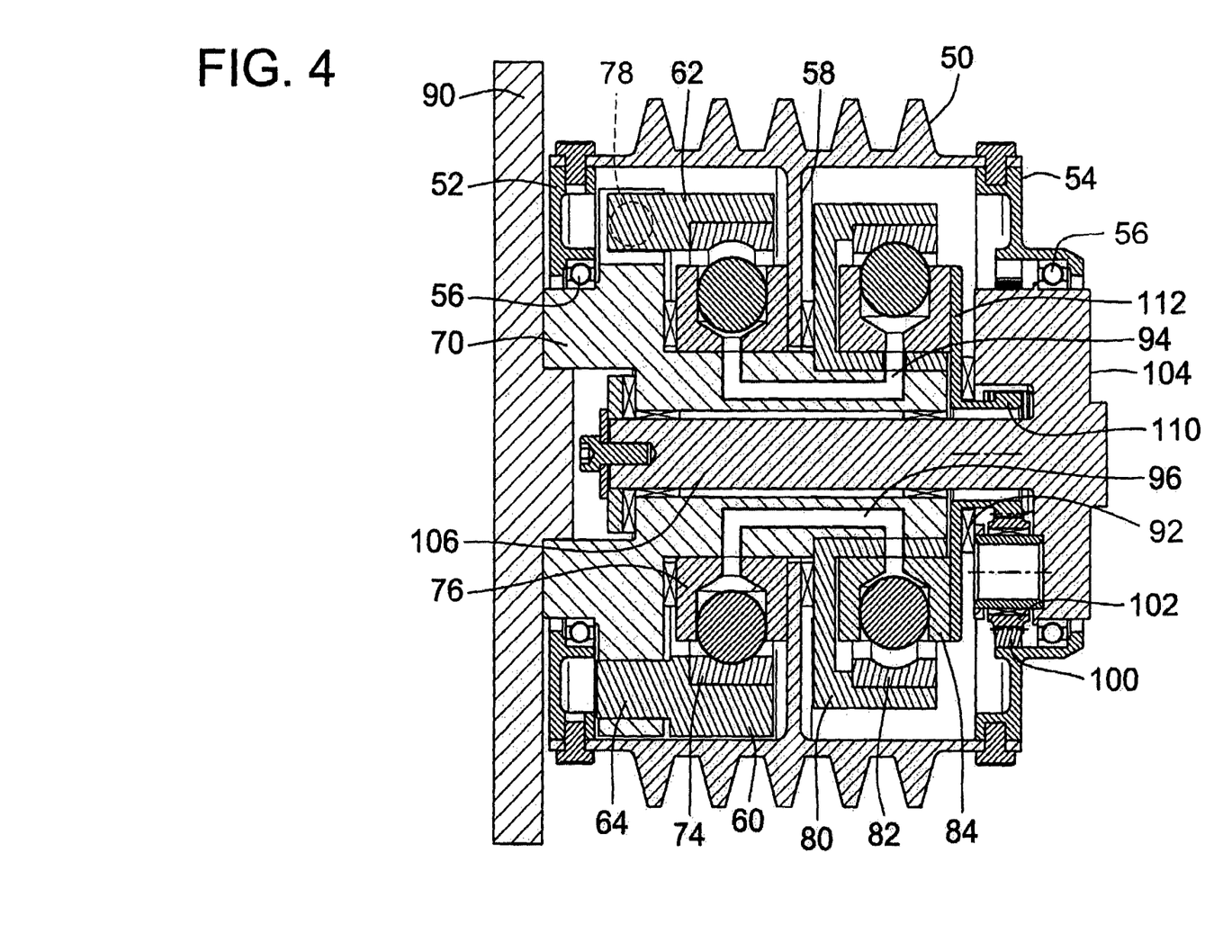
FIG. 4 is a cross-sectional view the embodiment of FIG. 2.
Figure 5:
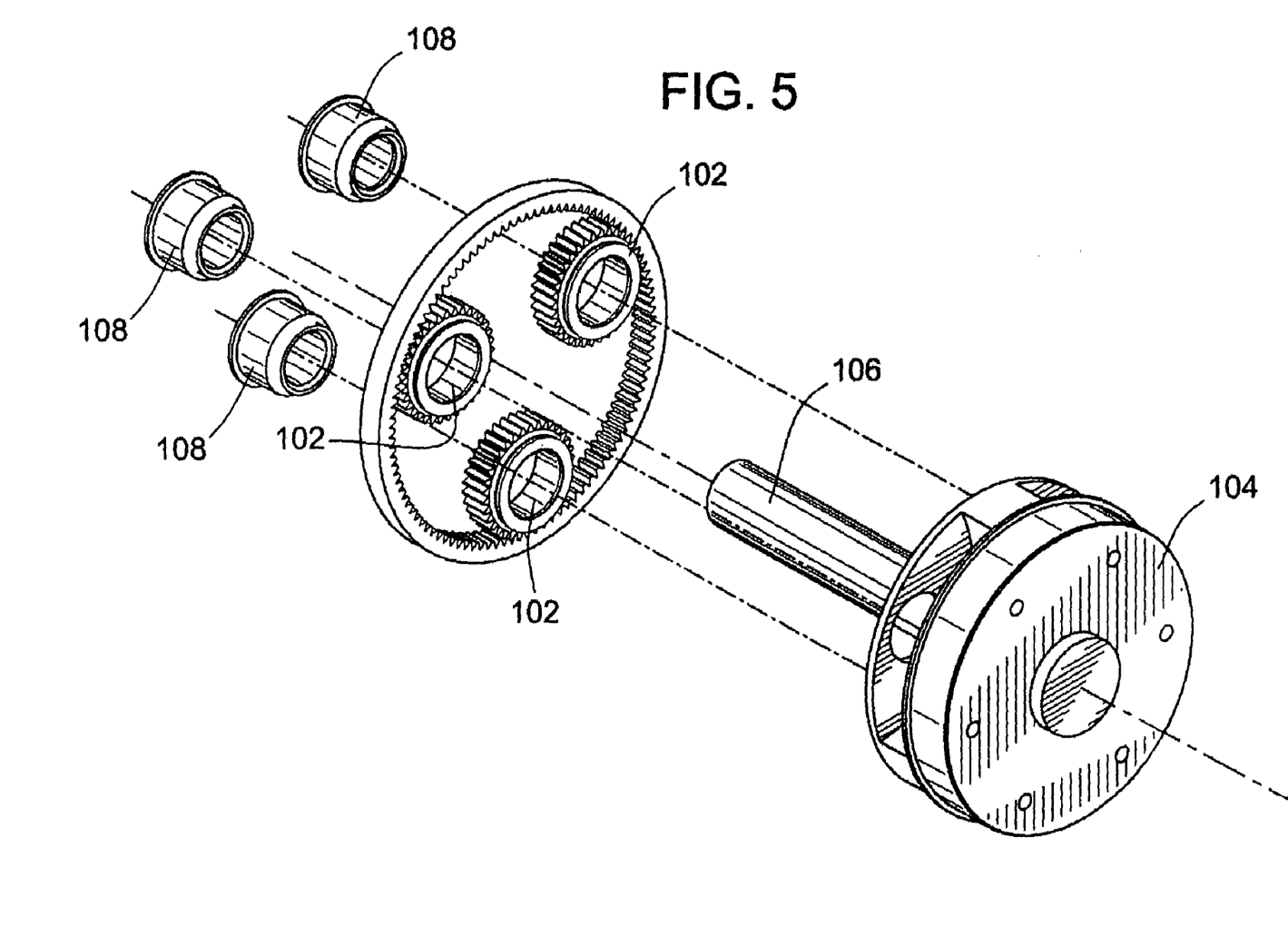
FIG. 5 is an exploded cross-sectional isometric view of the mechanical differential of the embodiment of FIG. 2.
Figure 6:
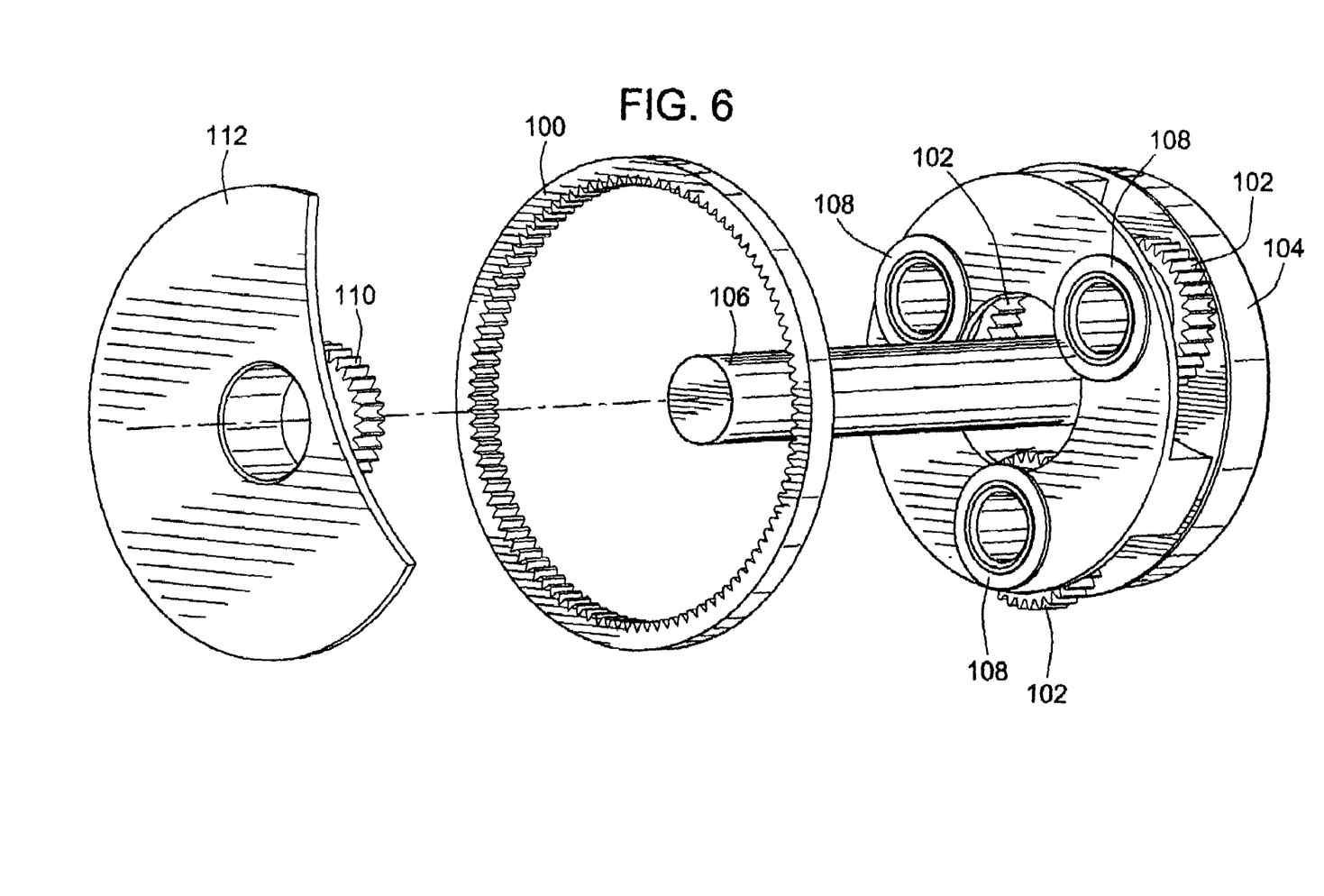
FIG. 6 is an isometric view of the mechanical differential of FIG. 2

Turning now to FIGS. 3A and 3B with reference to FIG. 4, the input 22 comprises the housing 50 and end pieces 52, 54 that are attached to the housing 50. The housing 50 has grooves that match the grooves of the v-belt 46. The end pieces 52, 54 ride on bearings 56. The housing 50 has an extension portion 58 that is attached to V-unit 26. The V-unit 26 has a variable eccentric ring 60 that has a tab 62 and pin 64 that fit within slot 66 and bore 68 respectively of plate 70. The ball pistons of the V-unit 26 ride within the V-unit assembly 72 (comprising outer race 74 and V-unit block 76) that is fit and restrained into the variable eccentric ring 60. The relative displacement of the V-unit 26 with respect to F-unit 28 is controlled by pistons 78. The pistons 78 control the eccentricity of the variable eccentric ring 60 as known in the art.

The F-unit 28 has an eccentric housing 80 in which the F-unit assembly (comprising outer race 82 and F-unit block 84) is fitted. The eccentric housing 80 is fit to shaft journal 88 of plate 70, which is attached to mounting plate 90, and the F-unit bock 84 rotates and is supported radially on shaft journal 86 of plate 70. The F-unit is isolated axially from carrier 104 by a thrust bearing 92. The plate 70 has passages to provide hydraulic fluid to the V- and F-units 24, 26 and for controlling the piston 78. The fluid passages include passages 94, 96 between the hydraulic units 24, 26 for fluid to flow between the units 24, 26 during operation.

The output differential 30 has a ring gear 100 that is mounted onto end piece 54. The planetary gears 102 are mounted within carrier 104 that has output shaft 106. The planetary gears 102 and associated bearings are held in place with bearing pins 108. The planetary gears 102 mesh with sun gear 110 and ring gear 100. The sun gear 110 is integral to a plate 112 that is attached to the F-unit block 84 of F-unit 26. The output shaft 106 rotates with the planetary gears 102.

During operation, the housing 50, V-unit block 76, ring gear 100, and end pieces 52, 54 rotate at the pulley speed (e.g., proportional to engine shaft speed). The ratio of the displacements of the V-unit 26 and F-unit 28 determine the speed of the sun gear 110. If the V-unit displacement is zero, the sun gear 110 does not rotate and the output shaft 106 rotates at a speed proportional to the input speed 22 established by the gear ratio of the differential. If the displacements are not equal, the hydraulic fluid moves between the V-unit 26 and F-unit 24, causing the F-unit 24 to move. As a result, the sun gear 110 rotates with the F-unit 24 in either a clockwise or counter-clockwise direction. The control loop sets the displacement ratio so that the sun gear 110 rotates at a speed such that the output shaft speed remains at the desired speed.

As an example of cost savings, assume that the accessory power at rated (50% engine) speed is 30 hp, the accessory speed is constant from 50 to 100% of engine speed an average engine speed of 75% and a life equivalent to 500,000 miles. At a specific fuel consumption of 0.50 lb/hp/hr with a fuel density of 7 lb/gallon and a fuel cost of 2 dollars per gallon, an estimated savings of $1,587.30 dollars/hp is saved for a 1 horsepower loss reduction over the life of the accessory drive with the parallel path having an efficiency of 91.6% at average speed. This leads to an estimated savings of approximately $109,000 over the life of a system when compared to the power draw of a system with a direct drive accessory drive system.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. For example, those skilled in the art will recognize that the output shaft 106 may be extended in either axial direction. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus that receives a mechanically driven input power at variable speeds and transmits that power to an output shaft at a desired speed, the apparatus comprising:

a housing that rotatingly receives the input power;

a variable displacement hydraulic unit connected to the housing and mounted within the housing;

a fixed displacement hydraulic unit within the housing, the variable displacement hydraulic unit in fluidic communication with the fixed displacement hydraulic unit; and a differential located within the housing and having a ring gear, a plurality of planetary gears in mesh relationship with the ring gear and a sun gear in mesh relationship with the plurality of planetary gears, the ring gear connected to the housing, the sun gear connected to the fixed displacement hydraulic unit, said differential connected to said housing independently of said variable displacement hydraulic unit, the output shaft connected to the plurality of planetary gears, said output shaft providing structural rigidity to said apparatus by substantially extending co-axially through the apparatus.

2. The apparatus of claim 1, said output shaft rotates at a speed proportional to the input speed established by the gear ratio of the differential if the displacement of the variable displacement hydraulic unit is zero.

3. The apparatus of claim 1 wherein if a displacement of the variable displacement hydraulic unit and a displacement of the fixed displacement hydraulic unit are not equal, hydraulic fluid moves between the variable displacement hydraulic unit and the fixed displacement hydraulic unit causing the fixed displacement hydraulic unit to rotate, thereby rotating the sun gear in a clockwise direction or counter-clockwise direction and causing the output shaft to rotate at a speed different from a speed proportional to the input speed established by the gear ratio of the differential.

4. The apparatus of claim 1, said plurality of planetary gears are mounted within a carrier, the output shaft connected to the carrier.

5. The apparatus of claim 1, said sun gear is integrally attached to a plate that is attached to the fixed displacement unit.

6. The apparatus of claim 1, said variable displacement hydraulic unit is supported on a second shaft journal.

7. The apparatus of claim 1 further comprising a plurality of pistons connected to the variable displacement hydraulic unit, the pistons controlling the displacement of the variable displacement hydraulic unit.

8. The apparatus of claim 1, said housing has a plurality of grooves configured to match grooves of a v-belt.

9. The apparatus of claim 1, said fixed displacement hydraulic unit comprises a fixed displacement block in communication with an outer race, the outer race mounted within an eccentric housing.

10. The apparatus of claim 1, said variable displacement hydraulic unit comprises a variable displacement block in communication with an outer race, the outer race mounted within an eccentric ring.

11. A method for providing a desired rotational speed to an output shaft of an apparatus having an input thereof rotatable at varying rotational speeds, said output shaft providing structural rigidity to said apparatus by substantially extending co-axially through said apparatus, the method comprising:

coupling a drive means to a housing of said apparatus, said housing coupled to a variable displacement radial ball piston hydraulic unit and a ring gear of a differential; said differential connected to said housing independently of said variable displacement hydraulic unit;

enabling said variable displacement radial ball piston hydraulic unit to transmit forces and pressures to a fixed displacement radial ball piston hydraulic unit through fluidic communication;

enabling said fixed displacement radial ball piston hydraulic unit, coupled to a sun gear of said differential to transmit motion to said sun gear;

enabling at least one of a planetary gear mounted in a carrier within said differential, said at least one of a planetary gear mechanically coupled to said ring gear and said sun gear to transmit rotational motion to said output shaft;

enabling rotation of the sun gear causing said output shaft to rotate at a desired rotational speed.

12. The method of claim 11 further comprising trimming varying rotational speeds with a speed of said sun gear to achieve the desired rotational speed of said output shaft, said speed of sun gear based upon a ratio of the displacements of said variable displacement radial ball piston and said fixed displacement radial ball piston hydraulic unit.

13. An apparatus that receives a mechanically driven input power at variable speeds and transmits that power to an output shaft at a desired speed, said apparatus comprising:

a housing that rotatingly receives the input power;

a variable displacement hydraulic unit connected to the housing and mounted within the housing;

a fixed displacement hydraulic unit within the housing, the variable displacement hydraulic unit in fluidic communication with the fixed displacement hydraulic unit, speed of a sun gear based upon a ratio of the displacements of said variable displacement radial ball piston and said fixed displacement radial ball piston hydraulic unit;

a differential located within the housing and having a ring gear, a plurality of planetary gears in mesh relationship with the ring gear and said sun gear in mesh relationship with the plurality of planetary gears, the ring gear connected to the housing, the sun gear connected to the fixed displacement hydraulic unit, said output shaft connected to the plurality of planetary gears, said differential mounted in said housing independently of said variable displacement hydraulic unit, said output shaft providing structural rigidity to said apparatus by substantially extending co-axially through the apparatus;

at least one ball piston, said at least one ball piston rides within said variable displacement hydraulic unit;

an eccentric fixed displacement hydraulic unit housing which houses said fixed displacement hydraulic unit;

a shaft journal of a plate to which said eccentric fixed displacement hydraulic unit housing is fitted, said plate further comprising passages to provide for fluidic communication between said variable displacement hydraulic units and said fixed displacement hydraulic unit;

at least one of a variable displacement hydraulic unit block configured to receive said at least one ball piston in said variable displacement hydraulic unit, said at least one of a variable displacement hydraulic unit block rotates and is supported radially by said shaft journal of said plate.

14. The apparatus of claim 13 further comprising at least one of a control piston, said at least one of a control piston connected to said variable displacement hydraulic unit and configured to vary the displacement of said variable displacement hydraulic unit.

* * * * *